United States Patent [19]
Wheeler

[11] Patent Number: 5,979,606
[45] Date of Patent: Nov. 9, 1999

[54] CONVEYOR ELEVATOR

[75] Inventor: Tracy Eugene Wheeler, Terre Haute, Ind.

[73] Assignees: Sony Corporation, Tokyo, Japan; Digital Audio Disc Corporation, Terre Haute, Ind.

[21] Appl. No.: 08/997,431

[22] Filed: Dec. 23, 1997

[51] Int. Cl.⁶ .................................................... B66B 9/02
[52] U.S. Cl. ...................................... 187/269; 198/464.1
[58] Field of Search .................................... 187/279, 269; 198/346.1, 463.3, 464.1, 465.1

[56] References Cited

U.S. PATENT DOCUMENTS

| | | | |
|---|---|---|---|
| 4,010,826 | 3/1977 | Jones | 187/269 X |
| 4,093,064 | 6/1978 | Crane | 198/463.3 |
| 4,701,097 | 10/1987 | Sturtz | 187/269 X |
| 4,829,748 | 5/1989 | Uehira et al. | |
| 5,178,255 | 1/1993 | Carlson | 198/346.1 X |
| 5,348,441 | 9/1994 | Takemasa et al. | |
| 5,384,760 | 1/1995 | Kumakura | |
| 5,419,503 | 5/1995 | Watanabe et al. | |
| 5,562,929 | 10/1996 | Asano | |

FOREIGN PATENT DOCUMENTS

WO89/00768 A1  1/1989  WIPO.

OTHER PUBLICATIONS

Catalog of Festo Corp. Cylinders, pp. 188–192, Oct., 1995.
Catalog of McMaster–Carr Supply Company, pp. 458–459.
Catalog of MB Building Kit Systems, Ltd., pp. 47 and 110.
Catalog Page Southworth Backsaver Lifts.

Primary Examiner—William E. Terrell
Assistant Examiner—Gene O. Crawford
Attorney, Agent, or Firm—Wood, Herron & Evans, L.L.P.

[57] ABSTRACT

An elevatable conveyor section having a base, a conveying element for supporting articles to be conveyed and scissors-linkage. The scissors-linkage has first ends connected with respect to first ends of the base and conveying element and second ends connected with respect to second ends of the base and conveying element. A lift has a linearly moving component connected to a perimeter of the conveying element. The lift is operated to selectively move the moving component and the attached conveying element up and down.

18 Claims, 3 Drawing Sheets

FIG. 4

CONVEYOR ELEVATOR

FIELD OF THE INVENTION

This invention relates to material handling and more particularly, to a conveyor section selectively movable to different elevations.

BACKGROUND OF THE INVENTION

Ongoing efforts to increase the efficiency and output of production operations have resulted in a continuing focus on how materials are moved with respect to the operations being performed. Often materials are moved on conveyors between operating stations. While conveyors are very useful in facilitating the automation of a manufacturing facility, conveyors do have a disadvantage of consuming significant floor space. Further, conveying materials up and down to different elevations requires even more floor space. For example, inclined conveyors are used to move material to different elevations. Inclined conveyors can take the form of linear or spiral conveyors, and both devices consume significant floor space area. Therefore, the floor space requirements of current conveyor devices limit potential benefits and economies in a production facility design. For example, they limit how existing conveyors at different elevations are to be interconnected. Further, they limit the potential benefit of attempting to stack conveyors at different elevations to provide more floor space for processing equipment.

As an alternative to the above, it is known to mount a roller conveyor top onto a stationary lift table. While such lift tables have an advantage of reducing the floor space consumed in order to move a conveyor section between elevations, there are limitations to their application. For example, known lift tables have the lifting device, for example, a cylinder located beneath the lift table and connected to the scissors-linkage. Such a construction often limits the minimum height of the assembly comprised of the lift table and the roller conveyor top.

Consequently, there is a need for a material handling system that does not have the limitations and disadvantages of known inclined conveyor devices for moving materials between different elevations.

SUMMARY OF THE INVENTION

The present invention provides a simple, compact, inexpensive and reliable elevatable conveyor section that may be used to interconnect existing conveyors over a wide range of elevations. The elevatable conveyor section is especially useful for those applications in which floor space is at a premium, and it is desired to minimize the area consumed by the conveying elements.

According to the principals of the present invention and in accordance with the preferred embodiments, the elevatable conveyor section includes a base, a conveying element for supporting articles to be conveyed, and scissors-linkage. The scissors-linkage has a first end connected with respect to first ends of the base and conveying element and a second end connected with respect to second ends of the base and conveying element. A lift having a linearly moving component is connected to a perimeter of the conveying element. The lift is operated to selectively move the moving component and the attached conveying element up and down.

In one aspect of the invention, the conveying element has opposed lateral sides and the scissors-linkage is comprised of two sets of scissors-legs. Each set of scissors-legs is located on one of the lateral sides, and each set of scissors-legs has a pair of scissors-legs pivotally connected at a point intermediate their ends.

In a further aspect of the invention, a cylinder is mounted in a generally vertical orientation outside a perimeter of the conveying element. The lower end of the cylinder is preferably attached at the midpoint of an end rail of the base and the moving component of the cylinder is preferably attached at the midpoint of an end member of the conveying element. By placing the cylinder outside the perimeter of the conveying element, the conveyor section has the advantage of collapsing to the minimum possible height thereby being able to interface with conveyors having a minimum height, for example, 5 inches.

These and other objects and advantages of the present invention will become more readily apparent during the following detailed description taken in conjunction with the drawings herein.

BRIEF DESCRIPTION OF THE DRAWINGS

FIG. 4 is a perspective view illustrating the elevatable conveyor in its lowered position and integrated with upper and lower conveyors.

DETAILED DESCRIPTION OF THE INVENTION

Figure 1:
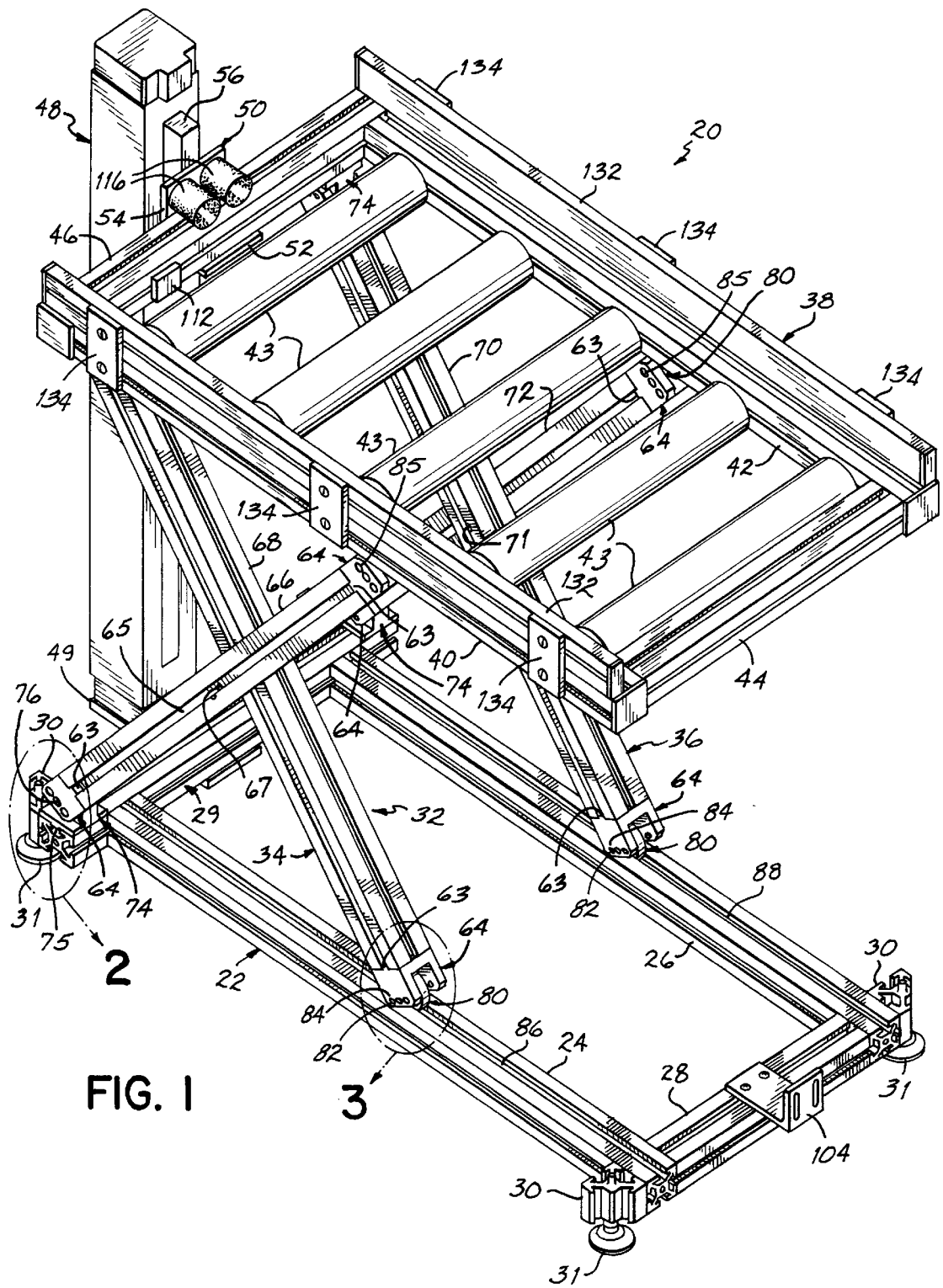
FIG. 1 is a perspective view of an elevatable conveyor in its elevated position in accordance with the principles of the present invention.
Figure 2:
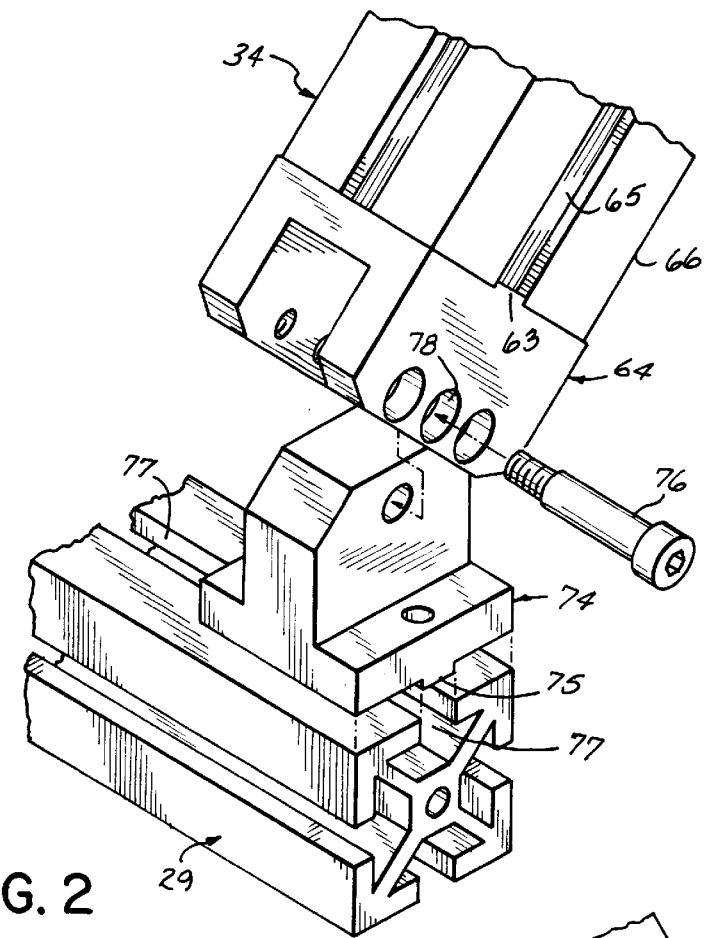
FIG. 2 is a partial disassembled perspective view of encircled area 2 of FIG. 1 illustrating the inner end of the scissors-legs of the elevatable conveyor.

Referring to FIG. 1, an elevatable conveyor 20 includes a generally rectangular base 22 comprised of side base rails 24, 26 a front base rail 28 and a rear base rail 29. The base 22 further includes four foot brackets 30 mounted at the corners of the base 22. Four feet 31 are threadedly mounted in respective foot brackets 30. A scissors-linkage 32 includes two pair of scissors-legs 34, 36 having lower ends mounted on respective sides of the base 22. Upper ends of the scissors-legs 34, 36 are mounted to respective sides of a generally rectangular conveyor section 38. The conveyor section 38 has a pair of lateral conveyor members 40, 42 that are connected at their ends to the ends of respective front and rear conveyor members 44, 46. Conveyor rollers 43 extend between and are rotatably connected to the lateral conveyor members 40, 42. A vertically oriented drive 48 has a lower end connected to a mounting bracket 49 which in turn is centrally mounted to the rear base rail 29. The drive 48 may, for example, be a double acting, rodless, type DGP, linear drive, pneumatic cylinder commercially available from Festo Corp. of Hauppange, N.Y. However, the cylinder 48 can be either a hydraulic or a pneumatic cylinder having the required load carrying capability. A generally L-shaped bracket 50 has a forward projecting leg 52 connected at the center of the rear conveyor member 46 and a perpendicular vertical leg 54 connected to a movable element 56.

A U-shaped bracket or clevis 64 is mounted on each end of each of the scissors-legs 66, 68 of the first pair of scissors-legs 34. Similarly, an identical clevis 64 is mounted on each end of the scissors-legs 70, 72 of the second pair of scissors-legs 36. Each clevis 64 has a tab or projection 63 sized to fit into a respective slot 65 to keep the clevis 64 in proper alignment with a respective scissors-leg 66, 68, 70, 72. Scissors-leg 66 is rotatably connected to scissors-leg 68 by a pivot pin 67, and scissors-leg 70 is rotatably connected to scissors-leg 72 by a pivot pin 71. The pivot pins 67, 71 are located approximately at the centers 67, 71 of the respective scissors-legs 66, 68, 70, 72. Normally, the pivot pins extend through low friction bushings or sleeve bearings (not shown) located in through-holes in the scissors-legs, and one end of the bushings have a shoulder located between the scissors-legs to keep the scissors-legs separated at the pivot point. Pivot mounts or blocks 74 are mounted at the rearward corners of the base frame 22 at the ends of the rear base rail 29. Each of the pivot blocks 74 has a centrally located key or projection 75 that is sized to fit into slots 77 to hold a respective pivot block in proper alignment with the base side rails 24, 26. Pivot pins in the form of shoulder bolts 76 extend through the center holes 78 of the clevises 64 mounted on the lower ends of the scissors-legs 66 and 72. In a similar manner, pivot mounts or blocks 74 are mounted on the lower sides at the ends of the rear conveyor member 46; and pivot pins in the form of shoulder bolts 76 extend through center holes 79 of the devises 64 attached to the ends of scissors-legs 68 and 70. Therefore, the rearward ends of the two pair of scissors-legs 34, 36 are pivotally mounted to the rearward ends of both the base 22 and the conveyor section 38.

Figure 3:
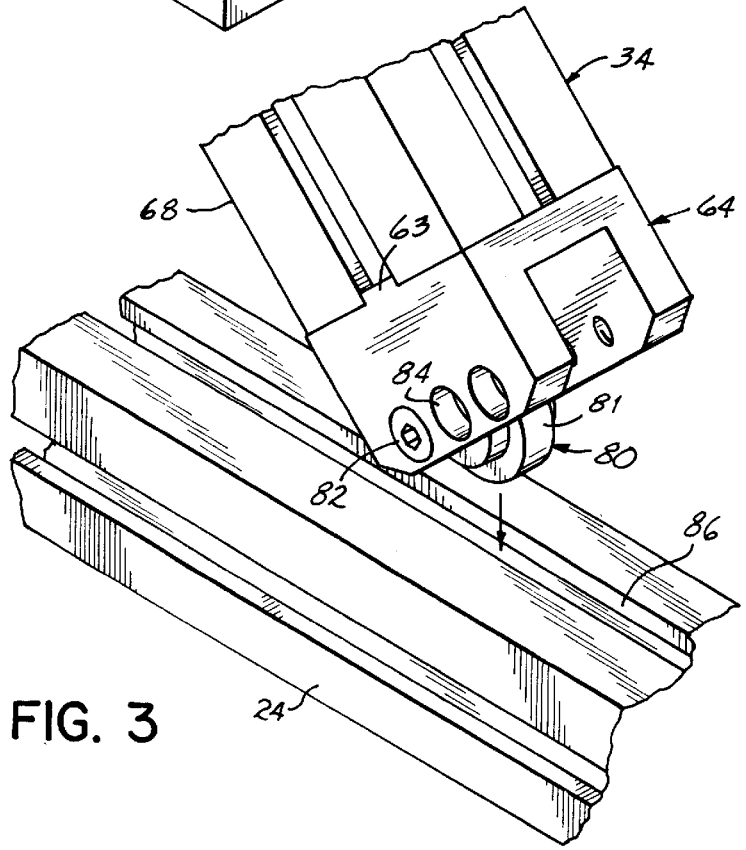
FIG. 3 is a partial disassembled perspective view of encircled area 3 of FIG. 1 illustrating the forward ends of the scissors-legs of the elevatable conveyor.

As shown in FIGS. 1 and 3, a wheel 80 is centrally mounted on an axle or spindle formed on a shoulder bolt 82 that extends through the bottom holes 84 of each clevis 64 attached to the lower ends of the legs 68, 70. In a similar manner, the axles in the form of shoulder bolts 82 extend through the upper holes 85 (FIG. 1) of each clevis attached to the upper ends of the legs 66, 72. The wheels 80 on the forward ends of the scissors-legs 68, 70 have respective guides formed by peripheral projections 81 sized to ride in paths or tracks formed by slots 86, 88 in the upper surfaces of the respective side base rails 24, 26. In a similar manner, wheels mounted in the forward ends of the scissors-legs 66, 72 have similar projections sized to ride in slots (not shown) in the bottom surfaces of the respective lateral conveyor members 40, 42. Therefore, as the movable element 56 of the cylinder 48 moves the conveyor section 38 vertically downward, the wheels 80 in the forward ends of the scissors-legs move forward, thereby collapsing the scissors linkage 32.

The base rails 24, 26, 28 29, conveyor section members 40, 42, 44, 46 and scissors-legs 66, 68, 70, 72 can be made from any material suitable for such structural members, for example, extruded aluminum beams and associated fasteners commercially available from MB Kit Systems Ltd. Of Akron, Ohio. The base rails are assembled by tapping a center through-hole in the ends of the rails and drilling clearance holes through the sides of the rails at the appropriate locations, and a threaded fastener is used to connect the rails together. The conveyor rollers 43 are also commercially available from MB Kit Systems Ltd.

Figure 4:
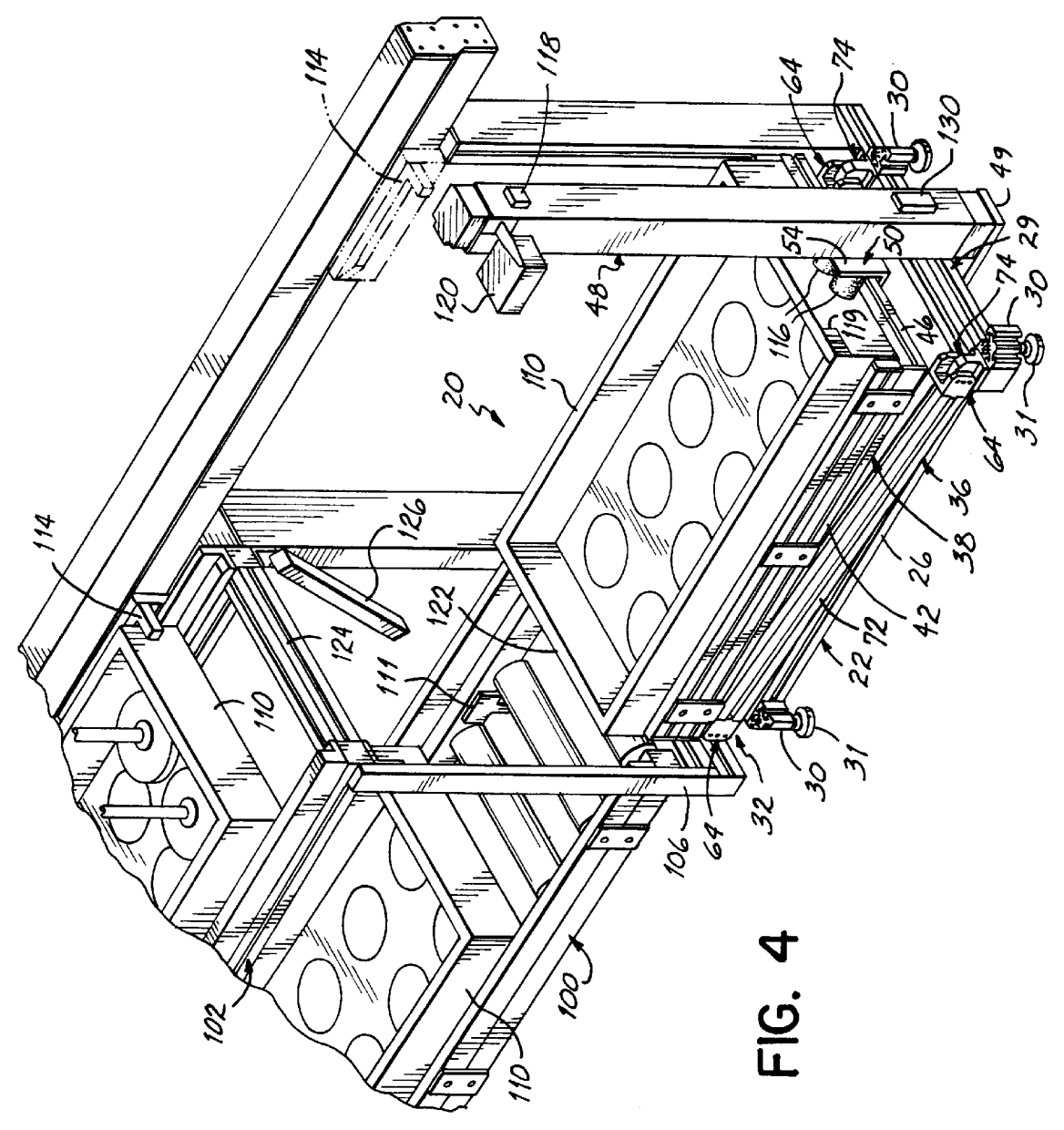

In use, referring to FIG. 4, the elevatable conveyor is used in conjunction with conveyors of different heights, for example, a lower, gravity-feed conveyor 100 and an upper, powered conveyor 102. Normally, the base 22 is positioned such that, the forward end of the conveyor section 38 is aligned with the end of the lower conveyor 100. A bracket 104 (FIG. 1) is used to attach the forward end of the base 22 to structure 106 supporting the end of the conveyor 100. It should be noted that the foot brackets 30 can be mounted to either the base end rails 28, 29 or the side rails 24, 26. In some applications, the end of the conveyor 100 may have a height of less than six inches. Mounting the cylinder 48 outside the perimeter of the conveyor section 38 permits the scissors-legs linkage 32 to collapse or fold together to the greatest extent possible. Thus, the conveyor section 38 can also have a minimum height of less than six inches to match the height of the end of conveyor 100.

In a known manner, the operation of the cylinder 48 is integrated with the operation of the conveyors 100, 102. For example, a tote 110 (FIG. 4) is being held in position by a conveyor stop 111 which restrains the tote 110 from rolling along the conveyor 100 toward the conveyor section 38. The conveyor stop 111 will only release the tote 110 if the conveyor section 38 is empty. The conveyor section 38 includes an infrared detector 112 (FIG. 1) that detects the presence of a tote 110 on the conveyor section 38. If the detector 112 detects that a tote 110 is not on the conveyor section 38 and further, a robot arm 114 is located at the rearward end of the elevatable conveyor 20 (as shown in phantom in FIG. 4), the conveyor stop 111 releases a tote 110. The tote 110 is moved by gravity along the lower conveyor 100 onto the conveyor section 38. The conveyor section 38 has guides 132 mounted on the lateral conveyor members 40, 42 with straps 134 to maintain the tote 110 in its proper centered position on the conveyor section 38. When the tote reaches the back end of the conveyor section 38, bumpers or cushions 116 mounted on bracket leg 54 stop the tote in its desired position. When the infrared detector 112 detects the presence of the tote 110 on the conveyor section 38, in a known manner, a solenoid (not shown) is operated to provide a greater pressure to the bottom of a piston (not shown) within the cylinder 48. As previously described, the cylinder piston, the movable element 56, bracket 50 and rear conveyor member 46 are all connected together. Hence, the upwardly moving cylinder piston moves the movable element 56, bracket 50, conveyor section 38 and tote 110 in the vertically upward direction. A sensor 118 is connected at the upper end of the cylinder 48 and functions to detect when the piston within the cylinder 48 is at its uppermost position. A check valve (not shown) is used to maintain the air pressure on the piston when in its uppermost position, and when in that position, a bar code reader 120 reads a bar code label 119 on an upper surface of an end of the tote 110. Thereafter, the robot arm 114, which is now located behind the rearward end of the tote 110, is retracted to pull the tote 110 off of the conveyor section 38 and onto the upper conveyor 102.

If the tote 110 is positioned away from the bumper 116 but still over the detector 112, the forward end 122 of the tote will extend beyond the forward conveyor member 44 and potentially interfere with the end 124 of the upper conveyor 102. Therefore, an alignment bar 126 is positioned such that, as the conveyor section 38 and tote 110 are elevated, the end 122 of the tote 110 is pushed by the bar 126 to its desired position. As will be appreciated, the robot arm 126 can be replaced by using a powered roller for one of the rollers 43 on the conveying element 38.

With the conveyor in its elevated position as shown in FIG. 1 and the infrared detector 112 detecting that the tote 110 is no longer present, a solenoid (not shown) is operated to provide a greater air pressure to an upper side of the piston (not shown) within the cylinder 48. In addition, that air pressure is provided to a pilot of the check valve (not shown) to operate the check valve and release air pressure from the lower side of the cylinder piston, thereby creating a greater pressure on the upper side of the cylinder piston. Thus, the cylinder piston moves in the downward direction, thereby moving the movable element 56, bracket 50, conveyor section 38 and tote 110 in the vertically downward direction. An output of sensor 130 changes state when the piston is in its lowermost position, thereby lowering the conveyor section 38 into alignment with the lower conveyor 100.

Thus, the elevatable conveyor 20 permits conveyors to be coupled and integrated at different elevations. By using conveyors at different elevations, less floor space is required for the conveyors; and processing machinery can be moved closer together in a small space. Further, the elevatable conveyor 20 uses less floor space than other traditional conveyor devices for changing elevation, for example, inclined and spiral conveyors. Further, the elevatable conveyor 20 can be easily fabricated from relatively inexpensive components with a minimum of special parts, for example, the clevis 64 and pivot block 74. Further, the unique construction of putting the cylinder outside the perimeter of the conveyor section 38 permits the conveyor section 38 to be lowered to a minimum height, thereby facilitating connecting the conveyor section 38 to existing conveyors.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, while the cylinder 48 is mounted centrally to the end conveyor member 46, thereby providing a flow-in, flow-out conveyor section, the cylinder can also be mounted at a rearward corner of the conveyor section 38 or along a lateral member 40, 42 to provide a flow-through conveyor section. Alternatively, a cylinder 48 can be mounted to each of the side member 40, 42 in an opposing relationship. As another alternative, the cylinder 48 can be replaced by a motor and chain drive in which a rotary drive, for example, a motor, is mounted on the base 22, and a chain or other moving element is connected to the conveyor section 38 and extends around an idler mounted at the height of the upper conveyor above the motor. As a further alternative, a motor and pinion can be mounted on the conveyor section 38, and the pinion engage a vertically extending rack.

Further, the scissors-linkage is described as being pivotally connected at rearward ends of the base and conveying element and movable mounted to forward ends of the base and conveying element. As will be appreciated, alternatively, the scissors-linkage may pivotally connected at forward ends of the base and conveying element and movable mounted to rearward ends of the base and conveying element. In addition, the disclosed embodiment illustrates a tote being raised to be filled; however, in other applications, the tote may be lowered to be filled.

Therefore, the invention in its broadest aspects is not limited to the specific details shown and described. Consequently, departures may be made from the details described herein without departing from the spirit and scope of the claims which follow.

What is claimed is:
1. An elevatable conveyor section for moving an article between adjacent upper and lower conveyors comprising:
  a base having opposite first and second ends;
  a conveying element having first and second ends for supporting articles to be conveyed;
  scissors linkage having a first end pivotally connected with respect to the first ends of the base and conveying element, and the scissors linkage having a second end movably mounted with respect to the seconds ends of the base and conveying element;
  a sensor mounted on the elevatable conveyor section and detecting a presence of the article on the conveying element;
  a bar code reader mounted on the elevatable conveyor section and reading a bar code on the article; and
  a lift having a linearly moving component connected to a perimeter of the conveying element, the lift being operable to selectively move the moving component and the conveying element up and down in response to the sensor detecting the presence of the article, the lift having a cylinder for moving the conveying element to an upper position permitting the article to be transferred between conveying element and the upper conveyor and to a lower position permitting the article to be transferred between conveying element and the lower conveyor.

2. The elevatable conveyor section of claim 1 further comprising a bar code reader mounted on the conveyor section for reading a bar code attached to the article.

3. An elevatable conveyor section for moving an article between adjacent upper and lower conveyors comprising:
  a base having first and second ends adapted to rest on a surface;
  a conveying element having first and second ends oriented in common with the first and second ends of the base, the conveying element further having conveyor rollers for supporting the article to be conveyed;
  two sets of scissors-legs, each set of scissors-legs having opposite ends and being pivotally connected at a point intermediate their opposite ends, and each set of scissors-legs having
    a first end of one scissors-leg pivotally connected to the first end of the base and a second end of the one scissors-leg movably mounted with respect to the conveying element, and
    a first end of another scissors-leg pivotally connected to the first end of the conveying element and a second end of the other scissors-leg movably mounted with respect to the base;
  a sensor mounted on the conveyor section and detecting a presence of the article on the conveying element; and
  a cylinder mounted to the first end of the base in a generally vertical orientation outside a perimeter of the conveying element and having a linearly moving component connected to the first end of the conveying element, the cylinder being operable to selectively move the moving component and the conveying element up and down in response to the sensor detecting the presence of the article, the cylinder being adapted to move the conveying element to an upper position permitting the article to be transferred between conveying element and the upper conveyor and to a lower position permitting the article to be transferred between conveying element and the lower conveyor.

4. The elevatable conveyor section of claim 3 further comprising a plurality of feet adjustably connected to the base for supporting the base on a surface.

5. The elevatable conveyor section of claim 3 further comprising a bumper adjacent the second end of the base for stopping the article being conveyed on the conveyor rollers.

6. The elevatable conveyor section of claim 3 wherein the base has two side rails with first and second ends corresponding to the respective first and second ends of the base and the conveying element has two lateral members with first and second ends corresponding to the respective first and second ends of the conveying element.

7. The elevatable conveyor section of claim 6 wherein each of the sets of scissors-legs are pivotally connected at approximately their respective mid-points.

8. The elevatable conveyor section of claim 6 further comprising guides mounted on the lateral members for maintaining articles on the conveyor.

9. The elevatable conveyor section of claim 6 wherein the first end of the base is located adjacent the upper and lower conveyors, and the second end of the base has an end rail extending between the second ends of the side rails.

10. The elevatable conveyor section of claim 9 wherein a lower end of the cylinder is attached to the end rail.

11. The elevatable conveyor section of claim 10 wherein the lower end of the cylinder is attached to a midpoint of the end rail.

12. The elevatable conveyor section of claim 11 wherein the second end of the conveying element has an end member extending between second ends of the two lateral members and the moving component of the cylinder is connected to the end member of the conveying element.

13. The elevatable conveyor section of claim 12 wherein the moving component of the cylinder is connected to a midpoint of the end member of the conveying element.

14. The elevatable conveyor section of claim 6 wherein each of the side rails and lateral members has a linear path.

15. The elevatable conveyor section of claim 14 wherein each of the second ends of the scissors-legs has a guide movable along a respective path in a respective one of the rails and lateral members.

16. The elevatable conveyor section of claim 15 wherein the path in each of the rails and lateral members is a slot.

17. The elevatable conveyor section of claim 16 wherein the guide on each of the second ends of each of the scissors-legs has a peripheral portion sized to fit into the slot.

18. The elevatable conveyor section of claim 17 wherein the guide on each of the second ends of each of the scissors-legs is a wheel rotatably connected to the second ends of each of the scissors-legs, and the wheel includes a peripheral portion sized to fit into the slot.

* * * * *